(No Model.) 2 Sheets—Sheet 1.

M. C. COGSWELL.
PROCESS OF AND APPARATUS FOR MIXING AND COOLING SUGAR.

No. 292,100. Patented Jan. 15, 1884.

Witnesses: A. S. Fitch

Inventor: Mortimer C. Cogswell
By S. Fitch, Atty (No Model.) 2 Sheets—Sheet 2.

M. C. COGSWELL.
PROCESS OF AND APPARATUS FOR MIXING AND COOLING SUGAR.

No. 292,100. Patented Jan. 15, 1884.

Witnesses:
A. S. Fitch
A. J. N. Vermilya

Inventor:
Mortimer C. Cogswell
By J. T. Fitch
Atty.

UNITED STATES PATENT OFFICE.

MORTIMER C. COGSWELL, OF BROOKLYN, NEW YORK.

PROCESS OF AND APPARATUS FOR MIXING AND COOLING SUGAR.

SPECIFICATION forming part of Letters Patent No. 292,100, dated January 15, 1884.

Application filed November 14, 1883. (No model.)

*To all whom it may concern:*

Be it known that I, MORTIMER C. COGSWELL, of Brooklyn, Kings county, State of New York, have invented an Improved Process of and Apparatus for Mixing and Cooling Sugar, of which the following is a full, clear, and exact description, reference being had to the accompanying drawings, forming part of this specification.

My invention consists in the hereinafter-described process of mixing and cooling sugar, which consists in feeding the sugar upon a horizontal disk within an inclosing-chamber, and by the rapid revolution of said disk carrying or throwing the sugar to the periphery of the disk and against the wall of the inclosing-chamber, and then, by means of wings or beaters on the circumference of the revolving disk, carrying or throwing the sugar rapidly around the said chamber and breaking up or mixing the sugar, and then allowing the broken or mixed sugar to fall from said chamber into another chamber, and be therein finely distributed and more or less agitated during its fall through said chamber, either by being caught and thrown by beaters or wings on the circumference of a disk revolving in said second chamber, or being blown by the air-currents created by such wings or beaters, the said sugar being subjected to a current of air drawn into and downward through the first chamber, and thence through and out of the second chamber, whereby the sugar is cooled and may be spouted or otherwise carried directly to the packing apparatus; and my invention also consists in the apparatus hereinafter described, whereby the process above recited may be performed.

Figure 1:
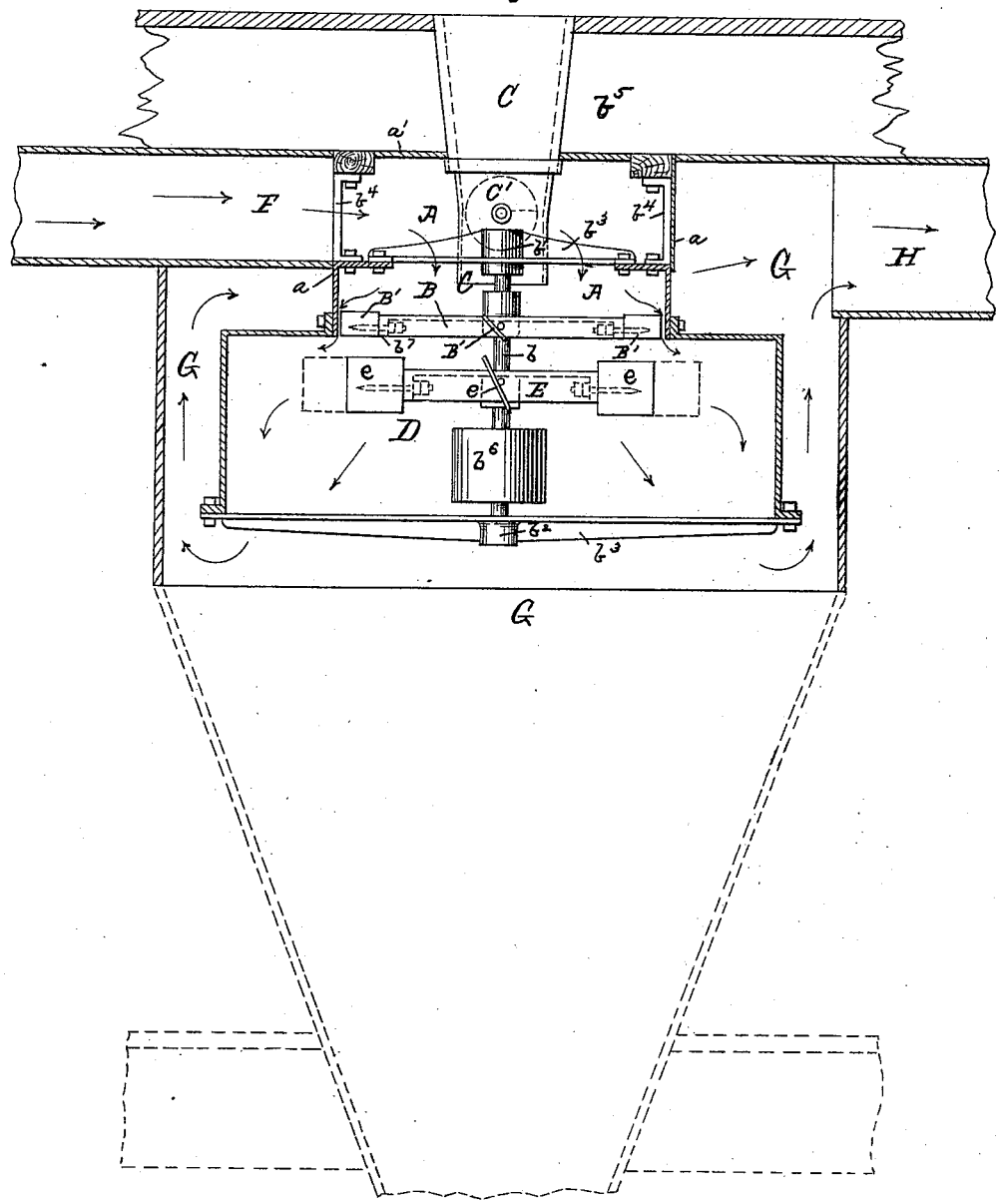
Figure 2:
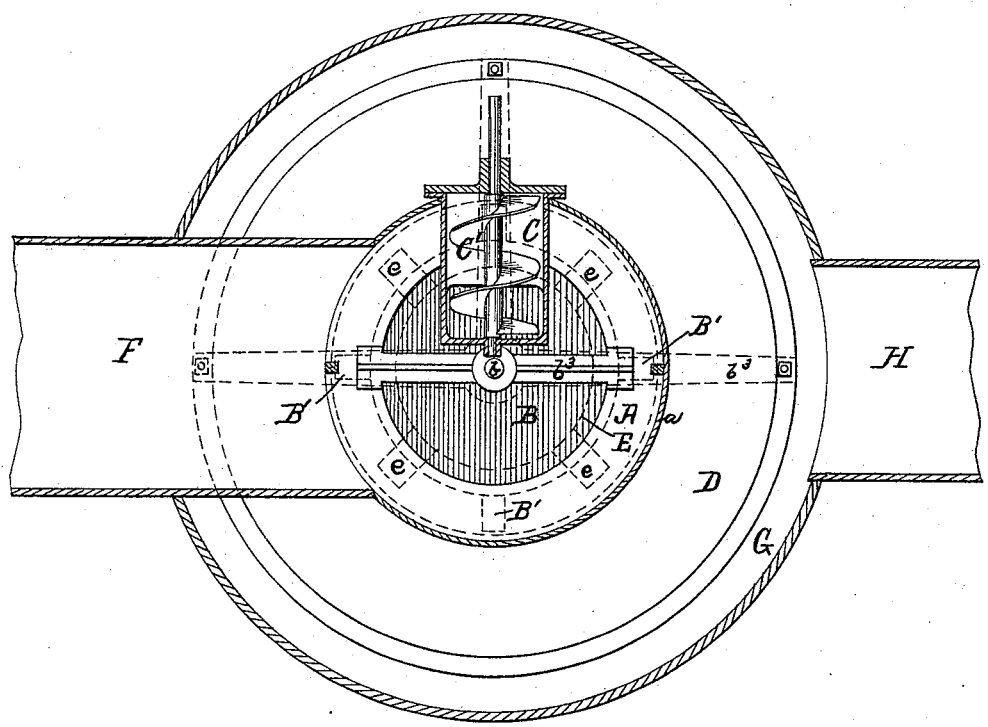

Figure 1 is a vertical central sectional view of an apparatus for mixing and cooling sugar, containing my invention, and which may be employed to carry out my improved process. Fig. 2 is a plan of the same, partly in section.

I will proceed first to describe the apparatus shown in the drawings.

A is a cylindrical chamber, composed of the circumferential wall $a$, and preferably closed at the top at $a'$, and open at the bottom, as shown, across its whole area. Within this chamber, and on a vertical shaft, $b$, is the horizontal disk B. This shaft may be rigged in any suitable manner desired. I show it mounted in bearings $b'$ $b^2$ in cross-braces $b^3$, supported by hangers $b^4$, bolted to the under side of floor-beam $b^5$, and having the driving-pulley $b^6$.

Upon the periphery of the disk B are bolted or otherwise attached the wings or beaters B′, and these beaters are more or less inclined or set at an angle to the horizontal plane in which they move.

At C is shown a hopper, preferably extending from the upper surface of the floor, to the under side of which the apparatus is hung, and said hopper leads down into chamber A, and is provided with a device for feeding the sugar at a uniform rate to the disk B. I find it preferable to employ for this purpose the blade-screw C′, as shown. The beaters B′ extend radially from the periphery of the disk to such a length that their outer extremities are closely contiguous to the inner face of the wall of chamber A, and yet so that they may move freely along said wall. It is preferable for the convenient attaching of the beaters to the disk that the disk should have the annular flange or ring $b^7$, to which the beaters may be secured by screw-bolts, or by a stem on the beater passing through the flange, and secured by nuts on the opposite side.

That part of the apparatus now described operates effectively as a mixer of the sugar. The sugar being taken as it comes from the centrifugal machines, is thrown into the hopper C, and is fed to and upon the disk B, at the center thereof, by the blade-screw C′, at a uniform rate. The rapidly-revolved disk B throws the sugar violently to its circumference and against the wall of the inclosing-chamber, where the sugar is caught by the beaters B′ and carried around by them and between their ends and the wall of the chamber with a whirling motion, thus thoroughly breaking up and mixing the sugar.

In treating some sugars it may be necessary to duplicate the disk B within the chamber A, and it may also sometimes be expedient, in order to secure the complete breaking up and mixing of the sugar, to so mount and arrange these two disks that they may be revolved in opposite directions. It is evident that this may be readily done.

At D is shown a chamber into which the chamber A opens through its bottom, said chamber D being placed directly below chamber A, and said chamber D being open at its bottom, as shown. Within this chamber D, and preferably on the same shaft which drives the disk B, is the horizontal disk or wheel E, carrying on its periphery the blades or beaters $e$, which are preferably inclined like the beaters carried by disk B, as shown. I deem it preferable that these blades $e$ should have a surface or area somewhat greater than that of the beaters B', and also that the disk E and its blades should be somewhat less in diameter than the disk B and its beaters, so that the travel of the blades $e$ will be within the line of the ends of the beaters B'. By this means the sugar as it falls from the chamber A will not come in contact with the blades $e$, but will be subjected to the air-current caused by the motion of the blades $e$ in the revolution of the disk E, and will be thereby thrown outward in the chamber D and be finely distributed as it falls through the said chamber. The blades $e$ may, however, be extended, out beyond the line of the ends of the beaters B', as shown in dotted lines in Fig. 1, and when thus formed the sugar in falling will be caught by the blades themselves and thrown outward in a finely-distributed state. The movement of the beaters and blades will operate to create a current of air through the apparatus, and the blades $e$ will not only throw the sugar in a finely-distributed state through the chamber D, but will also cause the air to be intimately mingled with the distributed sugar, and thus effect, more or less, the cooling of the sugar.

I find it preferable to employ a supplemental or additional supply of air in cooling the sugar, and for this purpose I construct the air-conduit F, leading into the chamber A above the disk B, and I then inclose the chamber D in the chamber G, which may be of any proper and desired extent or capacity, and from this chamber G, I lead the air-exhaust conduit H, as shown. Cool air may be allowed or forced to enter at F, and it will then follow the sugar down through the chamber A and into the chamber D, and be therein intimately mingled with the distributed sugar as it falls through said chamber D, and the air will then pass through the open bottom of D into the chamber G, from whence it may, in its heated state, be exhausted at H.

The chamber G may have the inclined walls or hopper shown in dotted lines in Fig. 1, and the mixed and cooled sugar may thus be spouted directly to the packing apparatus through the floor of chamber G, thus avoiding a handling of the sugar between the cooler and mixer and the packer.

In carrying out my process the sugar, as described, is fed to the disk B in chamber A, and is thrown by the disk out against the wall of the chamber, and there broken and mixed by the action of the beaters B', and thence falls into the chamber D, where it is thrown outwardly and finely distributed by either the blades $e$ themselves or the air-currents created by said blades, air being brought into intimate contact with the thus distributed sugar as it falls through and out of said chamber D, thus accomplishing the cooling of the sugar.

What I claim as my invention, and desire to secure by Letters Patent, is—

1. The herein-described process for mixing and cooling sugar, which consists in first feeding the sugar upon a horizontal disk in an inclosing-chamber, and by the rapid revolution of said disk throwing the sugar to the periphery of the disk and against the wall of said chamber, then by means of beaters on the periphery of said disk throwing or whirling the sugar around said chamber and between the extremities of said beaters and the wall of said chamber, then allowing said sugar to fall into a lower and communicating chamber, and by means of revolving blades to finely distribute the sugar in said chamber, either by the air-currents created by said blades or by contact with said blades themselves, and causing a current of cooling-air to pass downward through the chambers and be intimately mingled with the distributed sugar in said lower chamber, all as described.

2. The combination of the chamber A, having the closed circumferential sides $a$, top $a'$, and an open bottom, the feed-hopper C, and the horizontal disk B, carrying the beaters B', all constructed to operate as specified, whereby the sugar is broken and mixed, as set forth.

3. The combination of the chamber A, open at its bottom, the feed-hopper C, the horizontal disk B, carrying the beaters B', the chamber D, with its open bottom, and the disk E, carrying the blades $e$, all constructed substantially as described, and for the purpose specified.

4. The combination of the chamber A, having an open bottom, the feed-hopper C, the horizontal disk B, carrying the beaters B', and the air-conduit F, leading into said chamber, together with the communicating chamber D, having an open bottom, and the horizontal disk E therein, carrying the blades $e$, all constructed substantially as described, and for the purpose specified.

5. The combination of the chamber A, having an open bottom, the feed-hopper C, the horizontal disk B, carrying the beaters B', and the air-conduit F, leading into said chamber, together with the chamber D, having an open bottom, and the horizontal disk E therein, carrying the blades $e$, and the outer inclosing-chamber, G, with the air-exhaust H leading therefrom, all constructed as described, and for the purpose specified.

6. The combination of the chamber A, having sides $a$ and top $a'$ and an open bottom, the feed-hopper C, and the horizontal disk B, carrying the beaters B', together with the air-inlet F, entering said chamber above said disk, all as and for the purpose specified.

MORTIMER C. COGSWELL.

Witnesses:
A. S. FITCH,
A. G. N. VERMILYA.